(12) United States Patent
Ichikawa et al.

(10) Patent No.: US 8,058,197 B2
(45) Date of Patent: Nov. 15, 2011

(54) CARBON COMPOSITE MATERIALS COMPRISING PARTICLES OF METAL CARBIDES DISPERSED THEREIN AND METHOD FOR PRODUCING THE SAME

(75) Inventors: Shigeru Ichikawa, Toyota (JP); Sumio Kamiya, Toyota (JP); Koji Yamada, Toyota (JP); Hironori Sasaki, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/842,787

(22) Filed: Jul. 23, 2010

(65) Prior Publication Data

US 2010/0292069 A1 Nov. 18, 2010

Related U.S. Application Data

(62) Division of application No. 11/587,250, filed as application No. PCT/JP2005/008268 on Apr. 22, 2005, now abandoned.

(30) Foreign Application Priority Data

Apr. 23, 2004 (JP) ................................. 2004-128360

(51) Int. Cl.
*C04B 35/565* (2006.01)
*C04B 35/532* (2006.01)
*C04B 35/83* (2006.01)
(52) U.S. Cl. ............. 501/91; 501/95.2; 501/99; 106/36; 188/251 A; 264/641; 264/29.1; 264/29.5; 264/29.6; 264/29.7
(58) Field of Classification Search ............ 501/99, 501/95.2; 264/641, 646, 29.1, 29.5, 29.6, 264/29.7; 106/36; 188/251 A
See application file for complete search history.

(56) References Cited

U.S. PATENT DOCUMENTS

| | | | |
|---|---|---|---|
| 4,722,817 A | 2/1988 | Nakano et al. | |
| 5,962,135 A | 10/1999 | Walker et al. | |
| 6,261,692 B1 | 7/2001 | Park et al. | |
| 6,676,887 B2 | 1/2004 | Lafdi | |
| 6,878,331 B2 * | 4/2005 | Huang et al. | ............ 264/434 |
| 7,207,424 B2 * | 4/2007 | Huang et al. | ............ 188/251 A |
| 7,348,286 B2 | 3/2008 | Yoshimura et al. | |

(Continued)

FOREIGN PATENT DOCUMENTS

EP 0 507 564 A2 10/1992

(Continued)

OTHER PUBLICATIONS

Machine translation of JP 11-217267, Aug. 1999.*

(Continued)

*Primary Examiner* — Karl Group
(74) *Attorney, Agent, or Firm* — Finnegan, Henderson, Farabow, Garrett & Dunner, LLP

(57) ABSTRACT

This invention provides carbon composite materials, which comprise metal carbide particles, at least the particle surfaces or the entirety of which are metal carbides, synthesized in situ from a metal source, i.e., at least one member selected from the group comprising metal particles, metal oxide particles, and composite metal oxide particles, and a carbon source, i.e., a thermosetting resin, dispersed in a carbon, carbon fiber, or carbon/carbon fiber matrix, and contain no free metal particles. This invention also provides a method for producing such composite carbon materials, which enables the production of carbon composite materials having a high coefficient of friction, high thermostability, and abrasion resistance.

1 Claim, 10 Drawing Sheets

U.S. PATENT DOCUMENTS

| | | |
|---|---|---|
| 7,449,234 B2 | 11/2008 | Fukagawa et al. |
| 2004/0155382 A1* | 8/2004 | Huang et al. .................. 264/450 |
| 2005/0221051 A1 | 10/2005 | Simpson et al. |
| 2005/0274581 A1 | 12/2005 | Huang et al. |
| 2008/0090064 A1 | 4/2008 | James et al. |

FOREIGN PATENT DOCUMENTS

| | | | |
|---|---|---|---|
| JP | 04-310568 | | 11/1992 |
| JP | 05-279119 | | 10/1993 |
| JP | 06183863 | * | 7/1994 |
| JP | 9-10922 | | 1/1997 |
| JP | 09-124368 | | 5/1997 |
| JP | 11-130537 | | 5/1999 |
| JP | 11-217267 | | 8/1999 |
| WO | WO 2004/050319 A1 | | 6/2004 |

OTHER PUBLICATIONS

Lin et al., "Preparation and properties of SiC modified carbon/carbon composites by carbothermal reduction reaction," *Journal of Materials Science Letters*, 18:1353-1355 (1999).

Supplementary European Search Report for Appl. No. EP 05 73 6899, mailed Feb. 11, 2008.

* cited by examiner

Interface of SiC generated *in-situ* and carbon

Interface of mixed SiC and carbon

Results of EDX qualitative analysis at site A

Results of EDX qualitative analysis at site B

Results of EDX qualitative analysis at site C

Results of EDX qualitative analysis at site D

Results of EDX qualitative analysis at site A

Results of EDX qualitative analysis at site B

Results of EDX qualitative analysis at site C

CARBON COMPOSITE MATERIALS COMPRISING PARTICLES OF METAL CARBIDES DISPERSED THEREIN AND METHOD FOR PRODUCING THE SAME

CROSS REFERENCE TO RELATED APPLICATIONS

This is a divisional of U.S. application Ser. No. 11/587,250, now abandoned, which is a national phase application of International Application No. PCT/JP2005/008268, filed Apr. 22, 2005, which claims the priority of Japanese Patent Application No. 2004-128360, filed Apr. 23, 2004, wherein the content of U.S. application Ser. No. 11/587,250, International Application No. PCT/JP2005/008268, and Japanese Patent Application No. 2004-128360 are incorporated herein by reference.

TECHNICAL FIELD

The present invention relates to carbon composite materials having a high coefficient of friction, high thermostability, and abrasion resistance. Also, the present invention relates to a method for producing such carbon composite materials.

BACKGROUND ART

Carbon materials are combined with carbon fibers to prepare composite materials. Such process is known to be effective in order to improve the performance of such materials. For example, carbon fiber/carbon composite materials comprising high-strength carbon fibers are known as CC composite materials. Such materials are superior in specific strength (i.e., strength/density) to conventional metal materials, and thus, the applications of such composite materials are being expanded in various fields. For example, such CC composite materials are used for brake pad materials of automobiles or aircraft.

A variety of techniques for preparing reinforced carbon composite materials have been attempted via dispersion of second-phase particles in carbon materials. While the addition of dispersed particles results in the improved abrasion resistance of composite materials, the added particles sometimes become fracture origins in the materials and disadvantageously deteriorate the strength of the materials. In order to improve both the strength and the abrasion resistance of carbon materials via incorporation of second-phase particles, accordingly, it is necessary that fine second-phase particles be added in an amount required so as to result in a lack of deterioration of the strength of the material. It is necessary to add fine second-phase particles having an average particle diameter of 1 µm or smaller in order to realize satisfactory strength. It is deduced that the second-phase particles with the carbon matrix phase are suitable. Examples of such particles include high-purity metal carbides, such as tungsten carbide, titanium carbide, and silicon carbide, which remain stable without denaturing during the process of producing given members.

Production of fine particles of high-purity metal carbides in a cost-effective manner, however, involves serious technical difficulties. As the diameters of particles of metal carbides become small, dispersion of particles in a material with a carbon matrix phase becomes difficult due to aggregation or other activities. Accordingly, it is technically difficult to homogeneously incorporate such particles in a material with a carbon matrix phase. During the process for producing fine particles with very large specific surface areas, the surfaces of such particles are easily oxidized. Thus, it is practically impossible to prepare composite materials composed of carbon materials and fine particles of high-purity metal carbides.

JP Patent Publication (Kokai) No. 11-130537A (1999) discloses a method for producing a carbon composite material comprising particles of reinforcing metal carbides each with an average particle diameter of 1 µm or smaller dispersed therein, wherein starting powder materials having carbon matrix phases are mixed with at least one kind of metal oxide in advance, the mixture is molded and then calcined, and the calcination product is impregnated with pitch, followed by recalcination. This method is intended to produce carbon composite materials comprising particles of reinforcing, high-purity, and fine metal carbides dispersed therein in efficient and cost-effective manners.

JP Patent Publication (Kokai) No. 11-217267 A (1999) discloses a method for producing two-dimensional fiber-reinforced silicon carbide-carbon composite ceramics comprising forming a formed product comprising silicon powder, a resin as a carbon source, and a two-dimensional fiber-reinforced material into a desired shape, carbonizing the formed product at 900° C. to 1,300° C. in an inert gas atmosphere, impregnating the resultant with a resin, re-sintering the impregnated material at 900° C. to 1,300° C. in an inert gas atmosphere, iterating the resin impregnation and sintering, and finally sintering the material at about 1,350° C. to 1,500° C. in an inert gas atmosphere. This method is intended to readily produce two-dimensional fiber-reinforced silicon carbide-carbon composite ceramics having high strength and complicated shape regardless of high open porosity via impregnation of the ceramics with a resin and the reaction sintering method.

SUMMARY OF THE INVENTION

According to the method disclosed in JP Patent Publication (Kokai) No. 11-130537A (1999), powdery metal oxides are mixed with powdery carbon, and the dispersibility of the generated metal oxides is not sufficient. Thus, the amount of carbon provided in the vicinity of metal oxides was not sufficient, and the reaction between metal oxides and carbon was not sufficiently carried out.

According to the method disclosed in JP Patent Publication (Kokai) No. 11-217267 A (1999), SiC is generated by a direct reaction between silicon metal and carbon. Accordingly, unreacted silicon metals disadvantageously remained as free silicon metals.

It is an object of the present invention to provide carbon composite materials having a high coefficient of friction, high thermostability, and abrasion resistance, and to provide a method for producing such carbon composite materials.

The present inventors discovered that such object could be attained by combining a given metal source with a carbon source and generating particles of metal carbides in situ. This has led to the completion of the present invention.

Specifically, the first aspect of the present invention concerns friction materials comprising carbon composite materials, which comprise metal carbide particles, at least the particle surfaces or the entirety of which are metal carbides, synthesized in situ from a metal source, i.e., at least one member selected from the group comprising metal particles, metal oxide particles, and composite metal oxide particles, and a carbon source, i.e., a thermosetting resin, dispersed in a carbon, carbon fiber, or carbon/carbon fiber matrix, and contain no free metal particles.

The average particle diameter of the metal carbide particles, metal oxides, or composite metal oxides synthesized in situ in the carbon composite materials is not particularly limited. For example, it may be 2 μm to 5 μm. The shape of the metal carbide particles, metal oxides, or composite metal oxides is not particularly limited. For example, such particles may be approximately spherical or nonspherical in shape.

Preferably, a metal source is at least one member selected from the group comprising metal particles of Si, Ti, Zr, Al, W, Cr, and Zn, for example. These metal particles may be oxidized to obtain $SiO_2$, $TiO_2$, $ZrO_2$, $Al_2O_3$, $WO_3$, $CrO_3$, or ZnO particles, and at least one type of metal oxide particles or composite metal oxide particles selected therefrom is also preferably used as a metal source.

More specifically, it is preferable that the particles of metal oxides as a metal source be $SiO_2$ particles, and that the metal carbide particles generated therefrom be SiC particles. Preferable examples of $SiO_2$ particles include spherical silica particles obtained by a reaction between silicon metal and oxygen, spherical silica particles obtained by melting fragmented silica, and fragmented silica particles. Also, it is preferable that the particles of composite metal oxides as a metal source be particles of $SiO_2/ZrO_2$ composite metal oxides and the metal carbide particles generated therefrom be the particles of SiC/ZrC composite carbides.

The second aspect of the present invention concerns a method for producing friction materials comprising carbon composite materials comprising metal carbide particles dispersed therein, wherein at least one of metal particles, metal oxide particles, or composite metal oxide particles is dispersed in a thermosetting resin to obtain a slurry mixture, carbon fibers are impregnated with the slurry mixture, carbonization is carried out to carbonize the thermosetting resin, and calcination is further carried out to generate metal carbides in situ, at least the particle surfaces or the entirety of which are metal carbides.

FIG. 1 shows a flow chart showing an example of a process for producing carbon composite materials comprising metal carbide particles dispersed therein.

As in the case of the first aspect of the present invention, at least one metal source selected from the group comprising metal particles of Si, Ti, Zr, Al, W, Cr, or Zn is preferably used, for example. Also, these metal particles may be oxidized to obtain $SiO_2$, $TiO_2$, $ZrO_2$, $Al_2O_3$, $WO_3$, $CrO_3$, or ZnO particles, and at least one type of metal oxide particles or composite metal oxide particles selected therefrom is also preferably used as a metal source.

More specifically, it is preferable that the particles of metal oxides as a metal source be $SiO_2$ particles and that the metal carbide particles generated therefrom be SiC particles. Preferable examples of $SiO_2$ particles include spherical silica particles obtained by a reaction between silicon metal and oxygen, spherical silica particles obtained by melting fragmented silica, and fragmented silica particles.

A thermosetting resin as a carbon source is not particularly limited. For example, a thermosetting resin, such as phenol resin, melamine resin, urea resin, epoxy resin, unsaturated polyester resin, alkyd resin, silicone resin, diallyl phthalate resin, polyamide-bismaleimide resin, or polybisamide triazole resin, or a thermosetting resin composed of two or more of such resins, can be used. A phenol resin with high carbon content is particularly preferable.

In the present invention, a method for producing a slurry mixture comprising at least one metal source selected from the group comprising metal particles, metal oxide particles, and composite metal oxide particles dispersed in a thermosetting resin as a carbon source is not particularly limited. In order to obtain a stable slurry mixture with good dispersion conditions, a dispersion stabilizer is preferably added to the slurry mixture, or particles as a metal source are preferably treated with a surfactant.

Since the slurry mixture is a solution comprising metal oxide particles and a dispersant incorporated in a phenol resin solution, use of a dispersant enables homogeneous dispersion of metal oxides in phenol resin. Homogeneous dispersion of metal oxides allows carbon to be present in an amount required for the reaction, which in turn realizes effective reactions.

In the present invention, a step of thermocompression bonding is carried out by laminating the impregnation product, following the step of impregnation and prior to the step of carbonization. Thus, carbon composite materials with a given thickness and strength can be obtained.

In the present invention, it is preferable to carry out the step of impregnating the carbon fiber materials with the slurry mixture comprising particles as a metal source dispersed in a thermosetting resin as a carbon source two or more times from the viewpoint of the production of high-density metal carbides. For example, prior to in situ production of metal carbide particles by the process of calcination, particles as a metal source are dispersed in a thermosetting resin to obtain a slurry mixture, and carbon fibers are impregnated with the slurry mixture for carbonization. This procedure is carried out two or more times. Alternatively, following in situ production of metal carbide particles by the process of calcination, particles as a metal source are dispersed in a thermosetting resin to obtain a slurry mixture, and carbon fibers are impregnated with the slurry mixture for carbonization. This procedure is iterated one or more times.

A reaction whereby silicon carbide is generated by allowing silica to react with carbon in the process of calcination is a solid-gas reaction. Since silicon monoxide reacts with carbon in the gas phase, importance is given to complete coverage of silica particles with carbon without leaving any gaps, in order to prepare particulate silicon carbides. After molding of the composite material, the phenol resin is carbonized by heating at 500° C. or higher, and contracted. Thus, gaps are formed. Silicon monoxide gas leaks from such gaps, and particulate silicon carbides are less likely to be formed. Prior to the step of calcination, the molding product is reimpregnated with liquid phenol resin, carbonization is then carried out, and silica particles are completely covered with carbon without leaving any gaps. Thus, particulate silicon carbides are generated.

In the present invention, carbonization is carried out at 200° C. to 1600° C., and preferably at 500° C. to 1000° C., in an inert gas atmosphere. Calcination is carried out at a temperature at which a thermosetting resin is thermally decomposed in an inert gas atmosphere and becomes a carbon source, such as at 1650° C. or higher.

The third aspect of the present invention concerns friction materials comprising the aforementioned carbon composite materials. With the utilization of properties of carbon composite materials, such as a high coefficient of friction, high thermostability, and abrasion resistance, such friction materials can be put to a variety of applications. Particularly effective applications of such materials are, for example, brake rotor and/or pad materials of automobiles or aircraft.

The carbon composite materials according to the present invention have properties such as a high coefficient of friction, high thermostability, abrasion resistance, and lightness in weight.

PREFERRED EMBODIMENTS OF THE INVENTION

Figure 1:
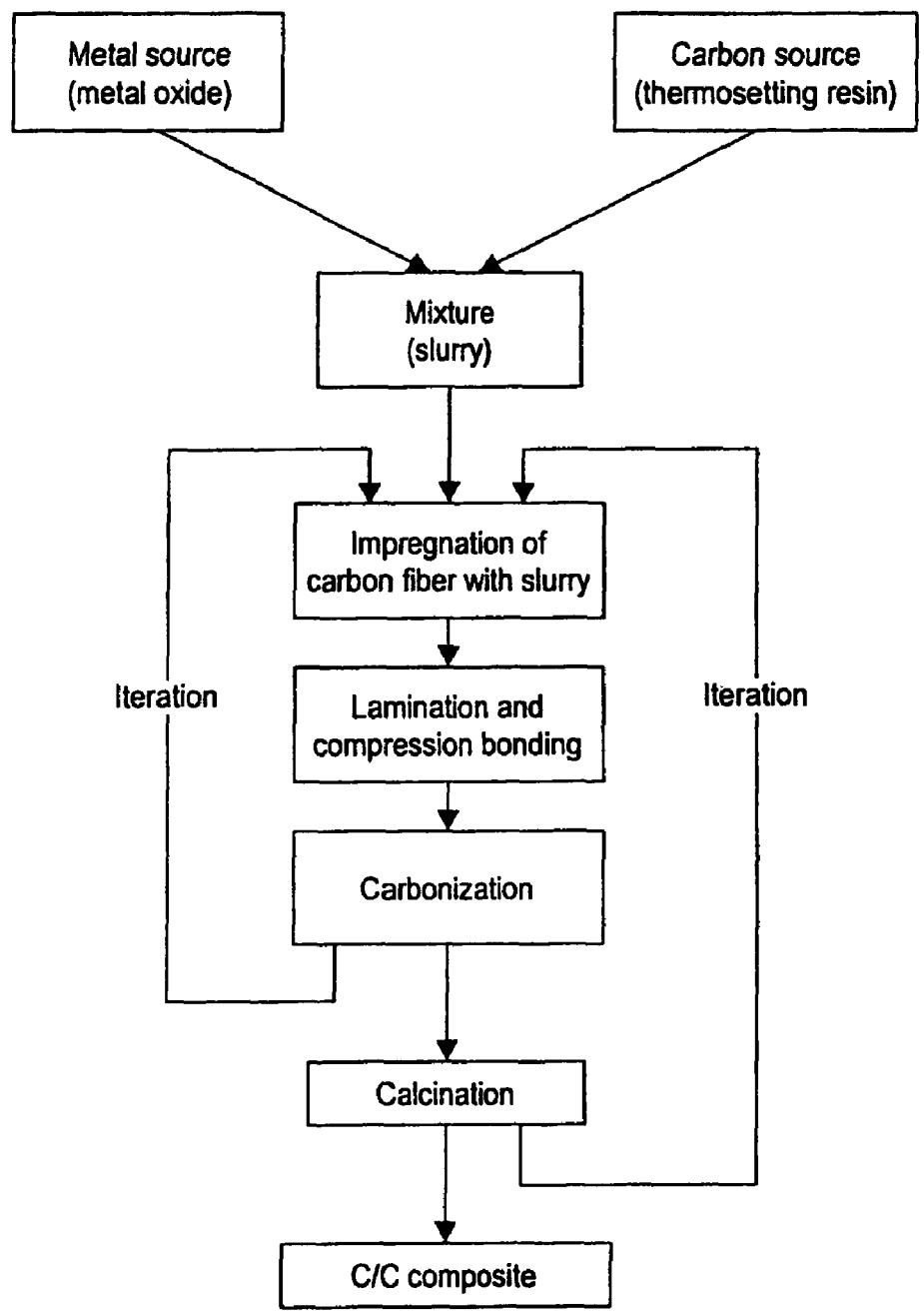
FIG. 1 shows a flow chart showing a process for producing carbon composite materials of the present invention.

Hereafter, the present invention is described with reference to an example of a carbon composite material comprising silicon oxide (silica: $SiO_2$) as a metal source.

A conventional technique is based on a direct reaction of metal (Si) and carbon (C). In the present invention, however, gas-phase SiO is generated by the stepwise reactions (1) and (2) shown below, and the SiO gas then reacts with carbon (C) to generate SiC.

$$SiO_2 + C \rightarrow SiO\uparrow + CO\uparrow \qquad (1)$$

$$SiO + 2C \rightarrow SiC + CO\uparrow \qquad (2)$$

Such a reaction whereby silica is allowed to react with carbon to generate silicon carbide is a solid-gas reaction, and complete coverage of silica particles with carbon without leaving any gaps is critical in order to generate particulate silicon carbide.

The reaction represented by formula (1) is carried out in combination with the reaction represented by formula (2) to realize the reaction represented by formula (3).

$$SiO_2 + 3C \rightarrow SiC + 2CO\uparrow \qquad (3)$$

Thus, metal carbide SiC is generated in situ with the use of metal oxide ($SiO_2$).

Advantageously, such reaction does not involve a free metal, and no free metal is present. Thus, a high coefficient of friction and high thermostability are exhibited. By regulating the amount and the configuration of $SiO_2$, the amount, the configuration, the particle diameter, and the like of SiC generated can be freely regulated. With the use of spherical $SiO_2$ sold by Admatechs Co., Ltd., spherical SiC can be synthesized in situ in carbon-carbon fiber composites (CC composites).

The present invention involves the use of a homodisperse slurry system comprising $SiO_2$ particles monodispersed in a solution of thermosetting resin precursors, such as a phenol resin, without aggregation. Thus, the surfaces of $SiO_2$ particles generated from the thermosetting resin precursors are covered via coating. This can prevent a reaction between a reinforcing material, i.e., carbon fiber, and $SiO_2$. Thus, the strength of the materials would not become deteriorated due to damaged carbon fibers, and the composite materials of the present invention are superior in strength to conventional composite materials.

More specifically, the features of the present invention are summarized as follows.

(1) Use of stable slurry comprising $SiO_2$ particles monodispersed in a solution of thermosetting resin precursors.

(2) Use of thermosetting resin precursors, $SiO_2$, and carbon fibers as starting materials.

(3) Performance of in situ reaction of $SiO_2$ selectively with carbon generated from thermosetting resin precursors to generate SiC and prevention of reaction of $SiO_2$ with carbon fibers.

(4) Firm conjugation of SiC with a carbon matrix phase via formation of a diffusion reaction phase.

(5) Homogeneous dispersion of generated SiC particles.

(6) A SiC/carbon/carbon fiber composite containing no free Si particles.

Hereafter, the carbon composite of the present invention is described using an electron micrograph.

Figure 2:
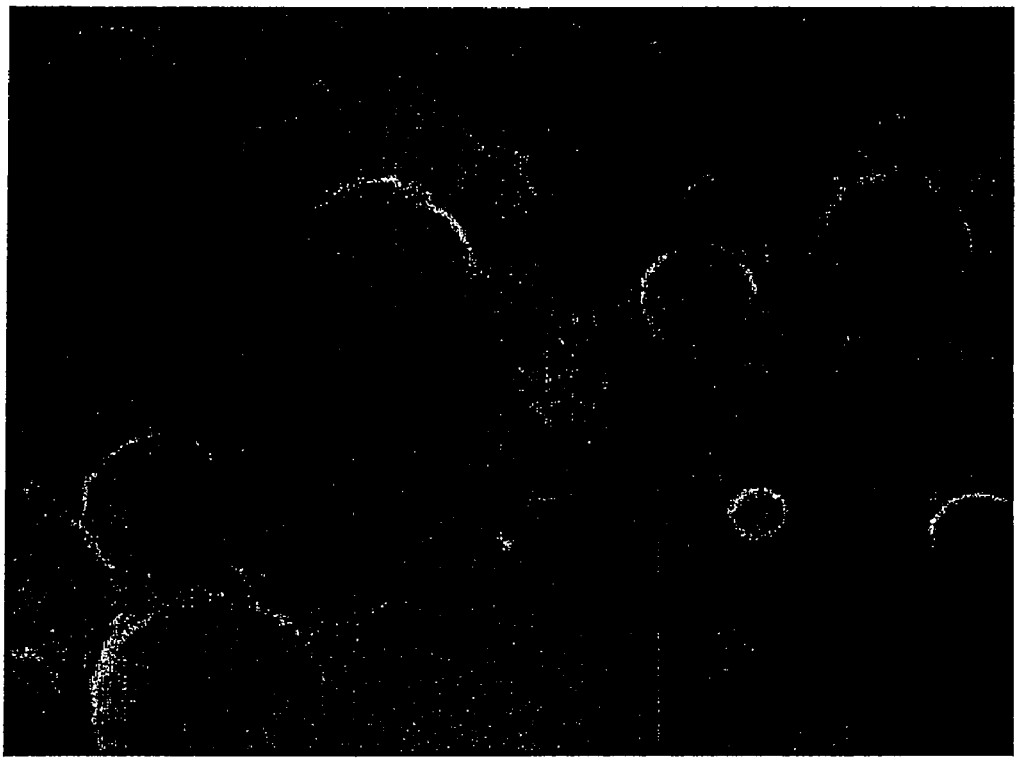
FIG. 2 shows a secondary electron image of a test piece molded according to the present invention.

FIG. 2 shows a secondary electron image of a test piece molded according to the present invention. In FIG. 2, particulate substances are the generated metal carbides. In the process of allowing metal oxides to react with carbon to generate metal carbides, it is important that a sufficient amount of carbon be positioned in the vicinity of the metal oxide particles without metal oxide aggregation. According to a conventional technique, when metal oxides and carbon are both powders, aggregation of some metal oxides is inevitable. According to the present invention, however, homogeneous dispersion of metal oxides in carbon was realized via incorporation of particles of metal oxides and a dispersant in a phenol resin solution.

Figure 3:
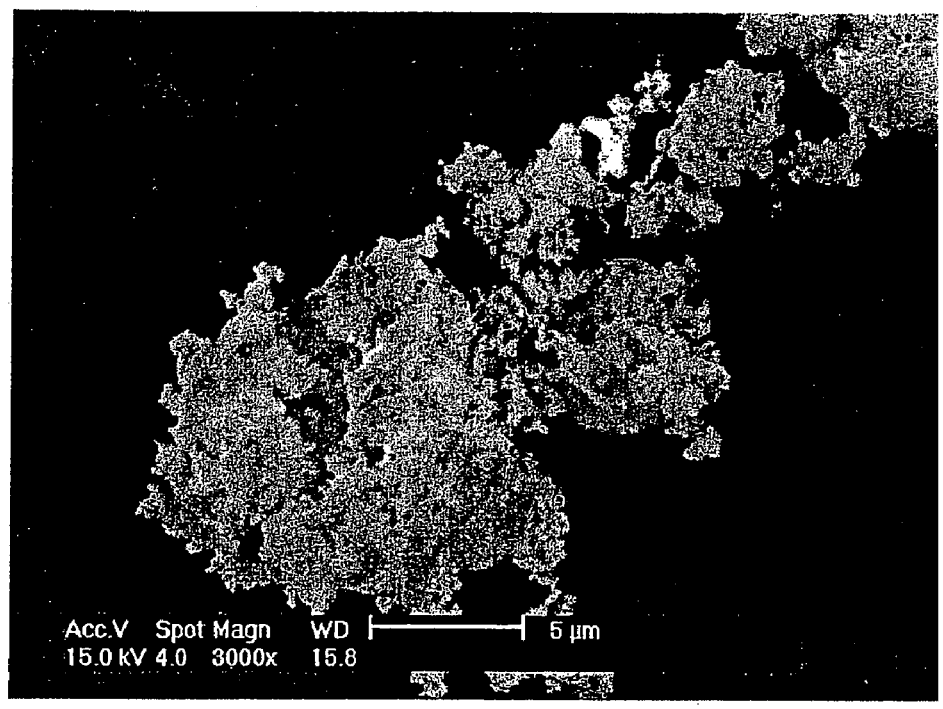
FIG. 3 shows a secondary electron image of silicon carbide, which was subjected to molding, carbonization, and then calcination immediately thereafter.

A reaction whereby silica particles are allowed to react with carbon to generate silicon carbides is a solid-gas reaction. In order to generate particulate silicon carbides, the peripheries of the silica particles must be completely covered with carbon without leaving any gaps. FIG. 3 shows a secondary electron image of silicon carbide, which was prepared by dispersing metal oxide particles in a phenol resin solution and subjected to molding and carbonization, followed by calcination immediately thereafter. Via a single operation of impregnation with a phenol resin solution and carbonization, silicon carbides generated had particle diameters of 1 μm or smaller.

Figure 4:
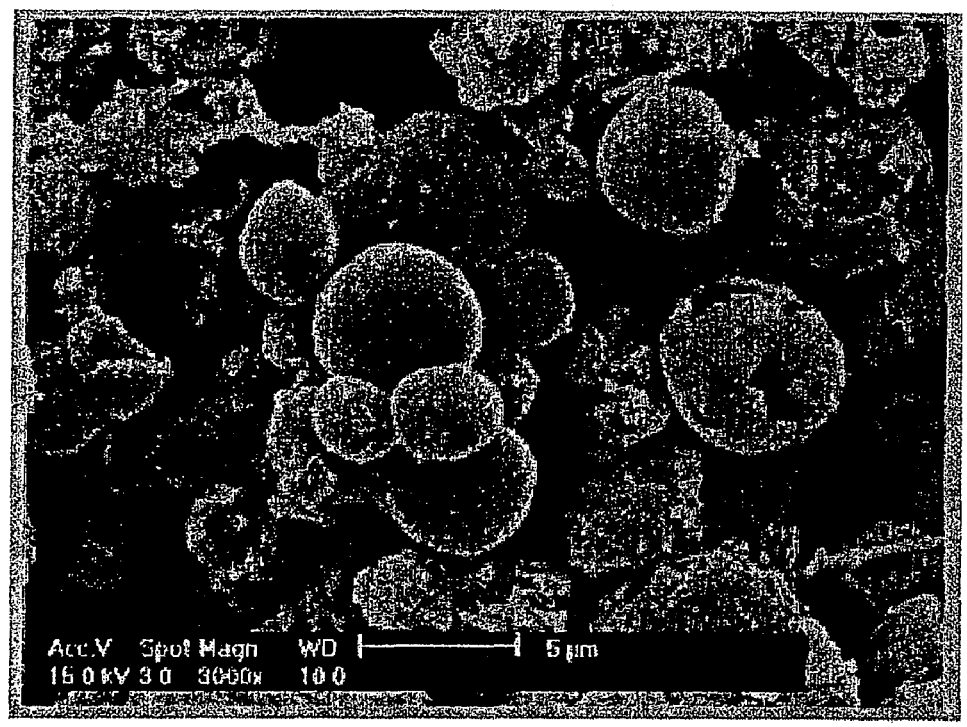
FIG. 4 shows the configuration of particles in a treated test piece that was subjected to molding, carbonization, reimpregnation with phenol resin, recarbonization, and then calcination.

FIG. 4 shows the configuration of particles in the treated test piece, which was prepared by subjecting a solution similar to that of FIG. 3 to molding, carbonization, reimpregnation with a phenol resin, recarbonization to provide a sufficient amount of carbon around the silica particles, and then calcination. As is apparent from FIG. 4, spherical silicon carbide particles with diameters of 2 μm to 5 μm are generated by subjecting the test piece to impregnation with phenol resin and carbonization twice, prior to calcination.

Metal oxides used in the present invention may be selected in accordance with, for example, reactivity with carbon materials or applications of carbon composite materials, without particular limitation. Examples of metal oxides include titanium oxide, chromium oxide, tungsten oxide, niobium oxide, silicon oxide, zirconium oxide, hafnium oxide, tantalum oxide, molybdenum oxide, and vanadium oxide.

Metal oxide particles or composite metal oxide particles that are obtained by oxidizing metal powders can be used. For example, any of silica, alumina, zirconia, mullite, spinel, and zinc oxide can be preferably used. Particularly preferably, spherical silica particles obtained by a reaction of silicon metal with oxygen, spherical silica particles obtained by melting fragmented silica, silica particles selected from among fragmented silica products, spherical alumina particles obtained by a reaction of aluminum metal with oxygen, spherical alumina particles obtained by melting fragmented alumina, and alumina particles selected among fragmented alumina products are used.

Metal oxide particles obtained by sintering metals are prepared in the following manner. That is, a chemical flame is formed in an atmosphere containing a carrier gas and oxygen, metal powder mixtures, such as powders of metals such as silicon, aluminum, magnesium, zirconium, or titanium, aluminum and silicon powders blended in mullite compositions, magnesium and aluminum powders blended in spinel compositions, and aluminum, magnesium, or silicon powders blended in cordierite compositions, are introduced into the chemical flame, and fine particles of metal oxides or composite metal oxides of interest, such as silica ($SiO_2$), alumina ($Al_2O_3$), titania ($TiO_2$), or zirconia ($ZrO_2$), are then produced in the chemical flame. Such particles of metal oxides are manufactured and sold by Admatechs Co., Ltd.

Examples

Starting materials of 1) silica particles with an average particle diameter of 3 μm and 2) liquid phenol resin were used. Silica particles were introduced into liquid phenol resin with a dispersant to adjust their concentrations to a C:Si ratio of at least 3:1, in terms of molar ratio. In this example, silica particles were mixed at a ratio of C:Si of 9:1, in terms of molar ratio.

A carbon sheet was impregnated with the aforementioned slurry, followed by molding via heating. After molding, the dispersion state of silica particles was observed under an electron microscope, and the photograph shown in FIG. 2 was obtained.

The molding product was subjected to carbonization in an inert gas atmosphere at 1000° C.

The carbon sheet was reimpregnated with phenol resin in a vacuum container, followed by recarbonization. Thereafter, the molding product was subjected to calcination in an inert gas atmosphere at 1650° C. The resulting test piece was observed under an electron microscope in order to inspect the particle shape. The test piece was simultaneously subjected to X-ray diffraction analysis and it was confirmed to be silicon carbide. FIG. 4 shows an electron micrograph.

[Comparison of In Situ Synthesis of SiC and Simple Incorporation of SiC]

In the present invention, SiC particles contained in carbon composite materials are synthesized upon in situ reaction between silica particles and carbon at the time of calcination. The interface of SiC generated in situ and carbon was compared with the SiC/C/C composite material prepared via simple mixing of SiC to evaluate the effects of the in situ reaction.

[Comparison of Tem Images]

The sample comprising SiC generated via in situ reaction was obtained by mixing spherical silica particles (average particle diameter: 3 μm) with phenol resin, curing the mixture to prevent foaming, and then calcifying the cured product at 1750° C. for 2 hours. The sample comprising SiC via simple mixing was obtained by mixing SiC particles (particle diameter: 2 to 3 μm) with phenol resin, curing the mixture to prevent foaming, and then calcifying the cured product at 1750° C. for 2 hours.

Figure 5:
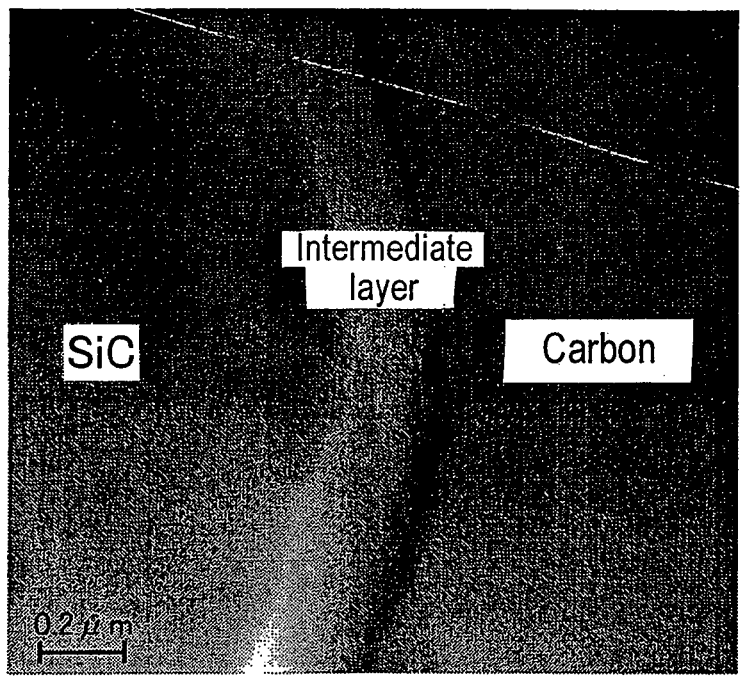
FIG. 5 shows a photograph of a TEM image of a sample comprising SiC synthesized in situ.
Figure 6:
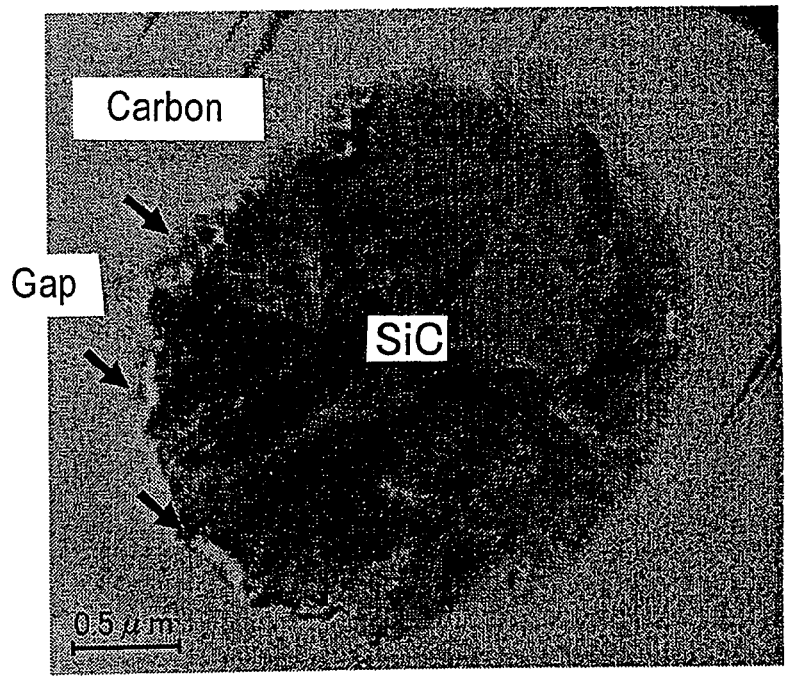
FIG. 6 shows a photograph of a TEM image of a sample comprising SiC mixed therewith.

The SiC/carbon interfaces of these two samples were observed by TEM. FIG. 5 shows a photograph of a TEM image of a sample comprising SiC synthesized in situ. FIG. 6 shows a photograph of a TEM image of a sample comprising SiC mixed therewith. At the SiC/carbon interface, an intermediate layer is generated and no gaps are observed in the photograph shown in FIG. 5, although some gaps are observed in the photograph shown in FIG. 6. This indicates that adhesion between SiC and carbon becomes improved via generation of SiC by in situ reaction.

[Comparison of EDX Qualitative Analysis]

Figure 7:
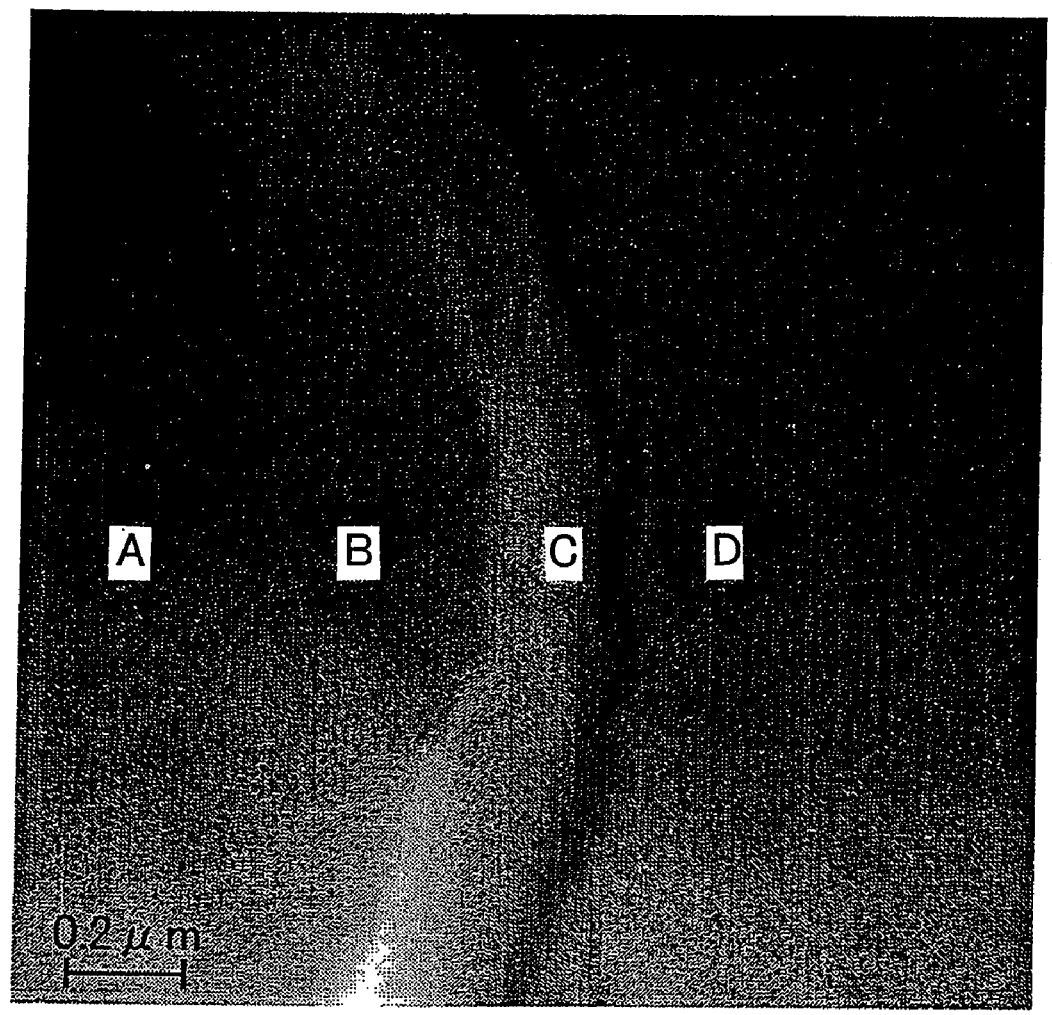
FIG. 7 shows a photograph of a TEM image of a sample comprising SiC synthesized in situ, which is the same as that of FIG. 5.
Figure 8:
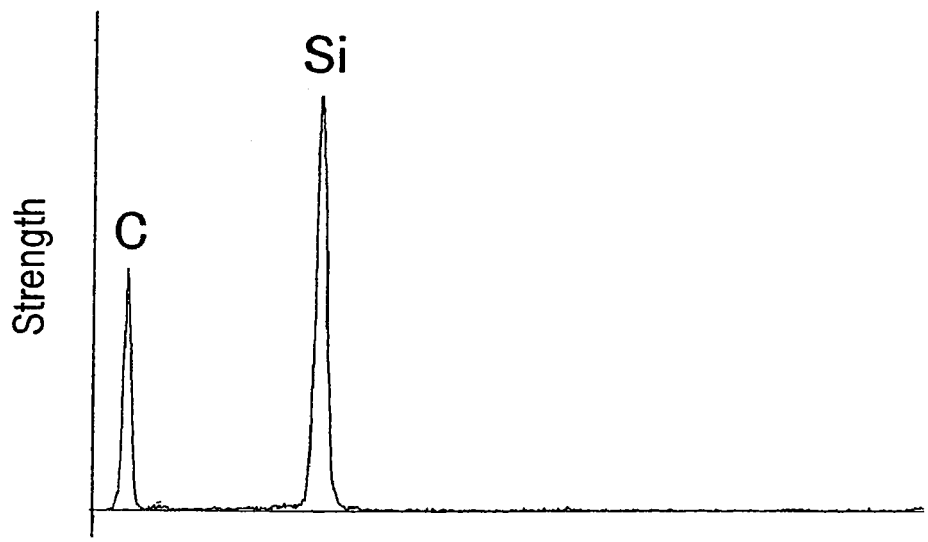
FIG. 8 shows the results of EDX qualitative analysis at sites A and B shown in FIG. 7.
Figure 8:
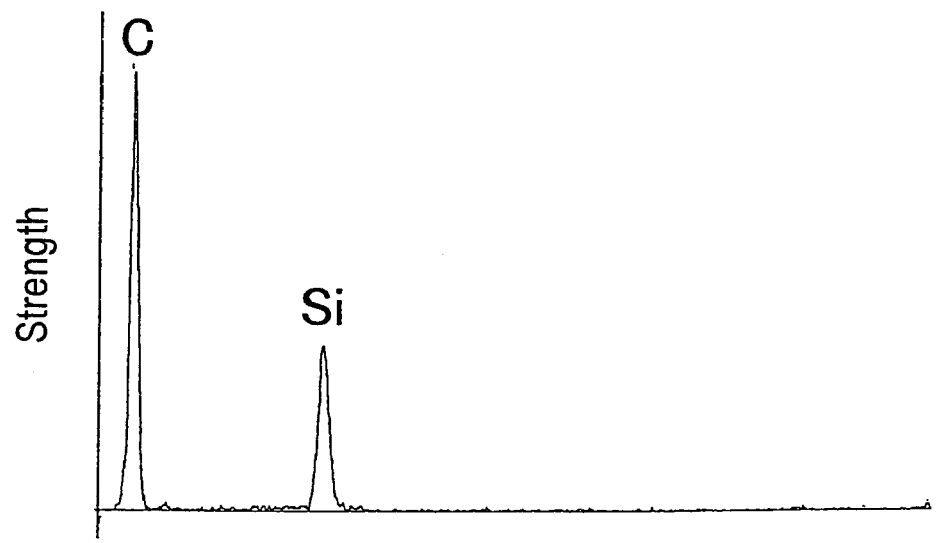
Figure 9:
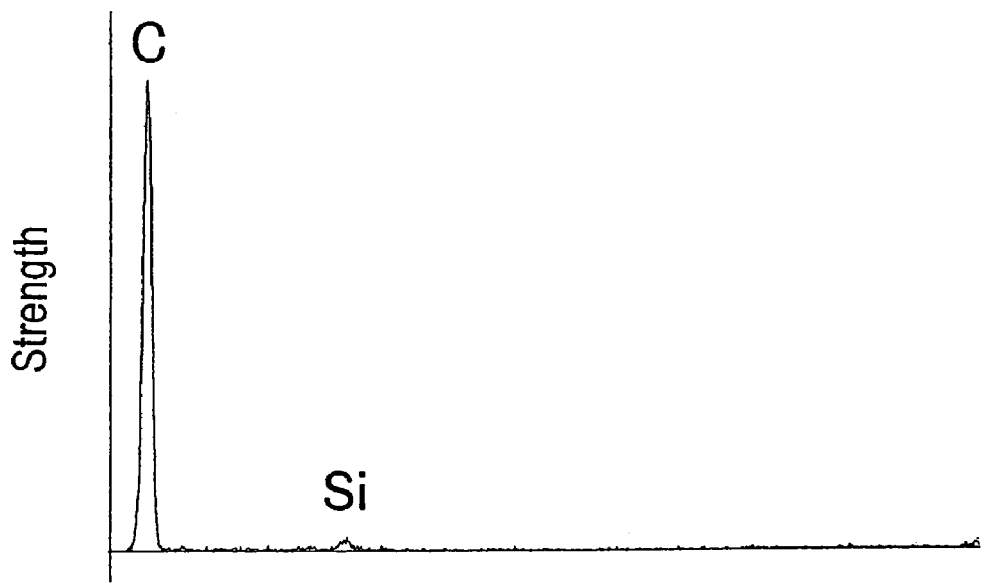
FIG. 9 shows the results of EDX qualitative analysis at sites C and D shown in FIG. 7.
Figure 9:
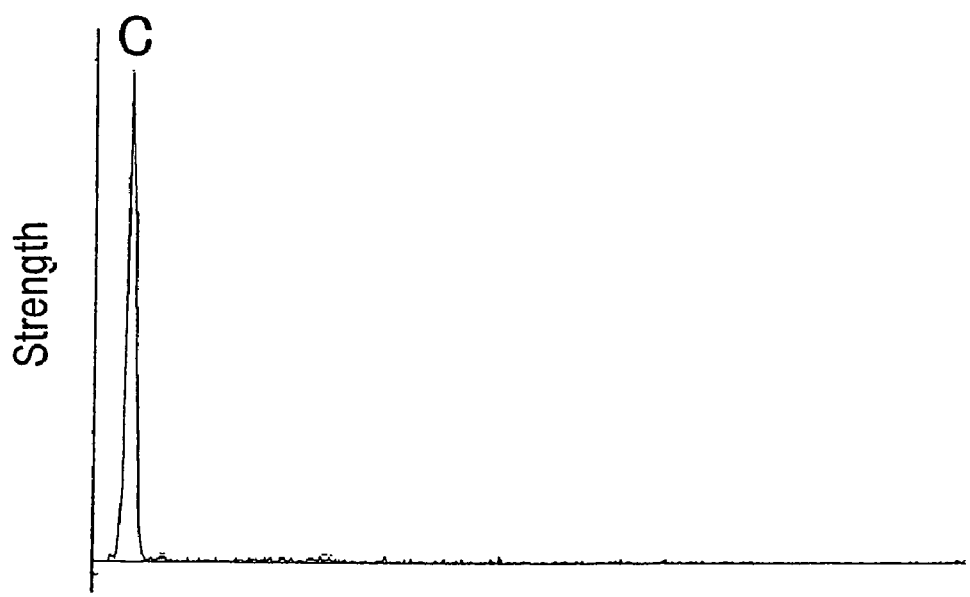

The TEM image of a sample comprising SiC synthesized in situ shown in FIG. 5 is shown again in FIG. 7. FIGS. 8 and 9 show the results of EDX qualitative analysis at sites A to D shown in FIG. 7. As is apparent from the results, site A represents SiC generated and site D represents carbon. As shown in the figures showing the results of EDX qualitative analysis, the Si peak intensity becomes smaller as the site for observation gets closer to site D from site A, and sites B and C are intermediate layers resulting from in situ reactions. Also, there are no gaps at the SiC/carbon interface, and SiC particles adhere to carbon.

Figure 10:
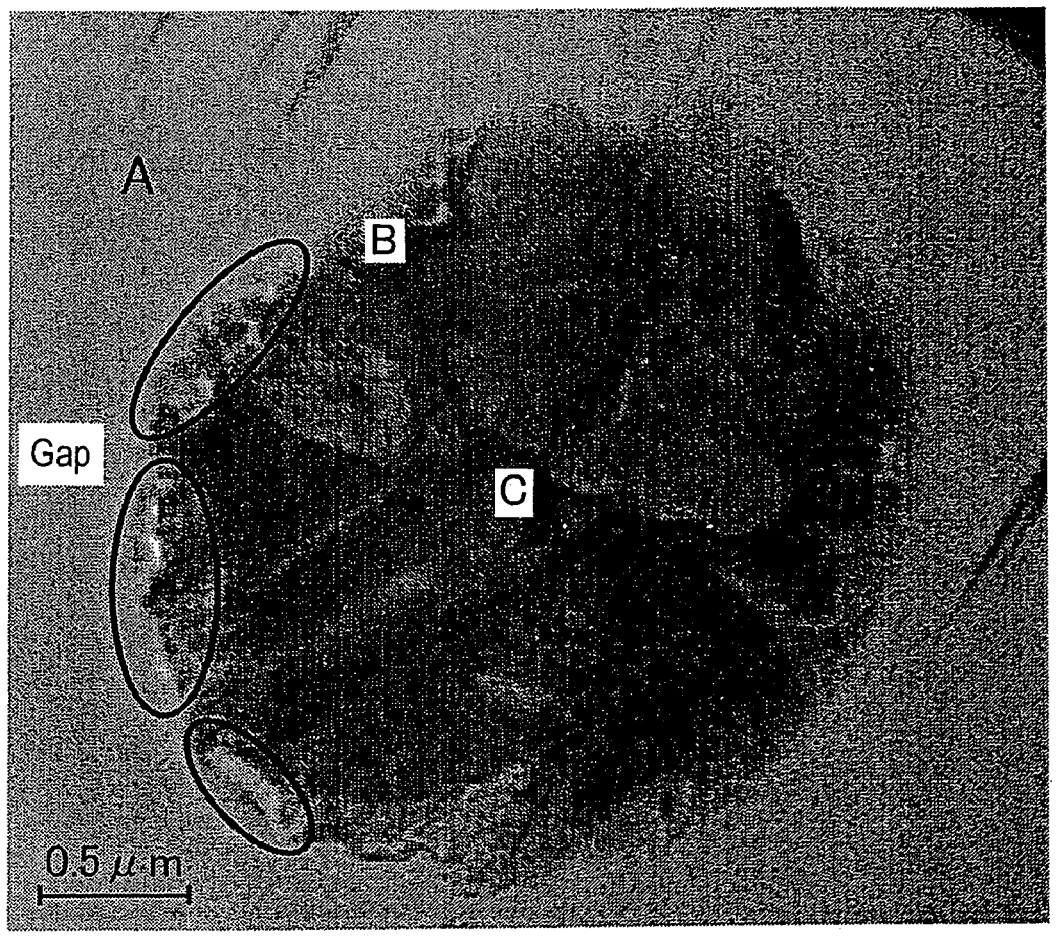
FIG. 10 shows a photograph of a TEM image of a sample comprising SiC mixed therewith, which is the same as that of FIG. 6.
Figure 11:
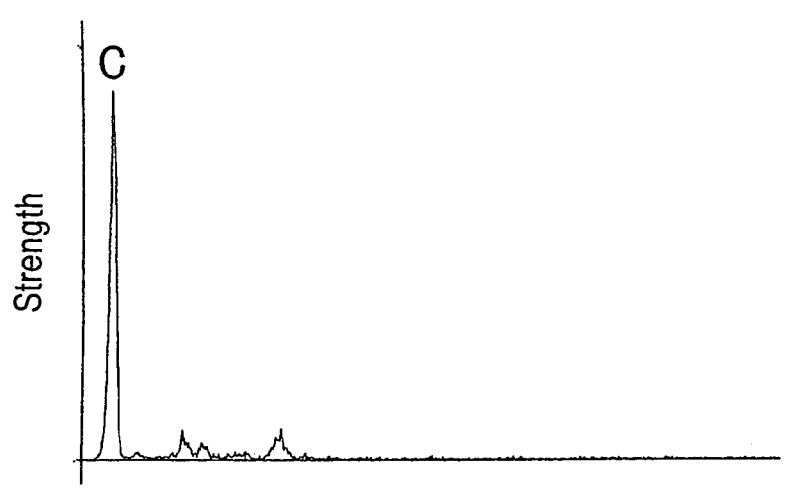
FIG. 11 shows the results of EDX qualitative analysis at sites A to C shown in FIG. 10.
Figure 11:
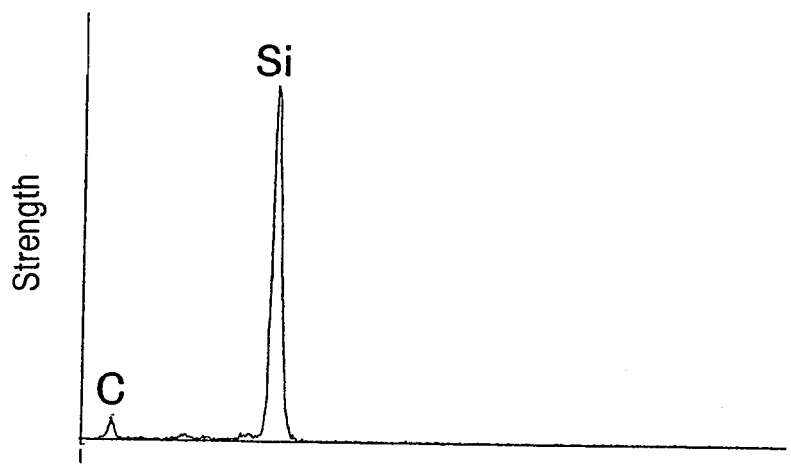
Figure 11:
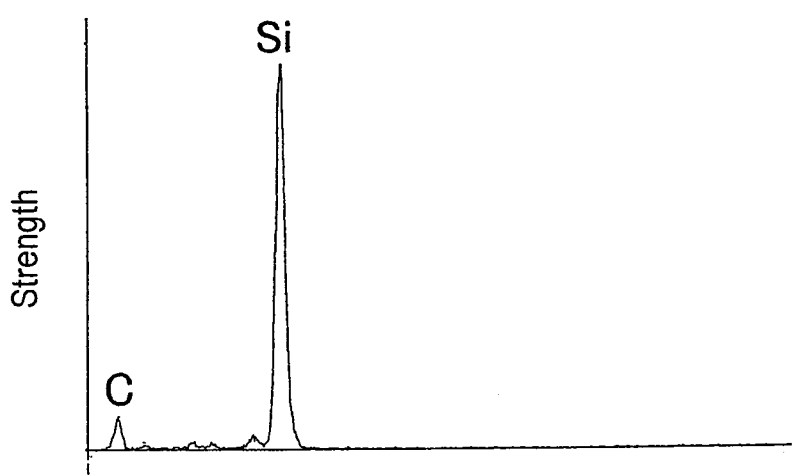

The TEM image of a sample comprising SiC mixed therewith shown in FIG. 6 is shown again in FIG. 10. FIG. 11 shows the results of EDX qualitative analysis at sites A to C shown in FIG. 10. As is apparent from the results, site A represents carbon and sites B and C each represent SiC, which was mixed in the sample. There are gaps at the SiC/carbon interface, and SiC particles do not adhere to carbon.

There were no gaps at the interface of SiC generated in situ and carbon, but there were gaps at the interface of SiC, which was mixed in the sample, and carbon. This indicates that generation of SiC via in situ reaction can realize better adhesion between SiC particles and carbon.

INDUSTRIAL APPLICABILITY

The carbon composite materials of the present invention have properties such as a high coefficient of friction, high thermostability, abrasion resistance, and lightness in weight. Thus, such materials can be used for a variety of applications as friction materials with the utilization of such properties. Also, such carbon composite materials have low production costs and thus are practical.

What is claimed is:

1. A method for producing a friction material comprising metal carbide particles dispersed therein, wherein:
   composite metal oxide particles are dispersed in a thermosetting resin to obtain a slurry mixture, carbon fibers are impregnated with the slurry mixture, and carbonization and calcination are carried out to carbonize the thermosetting resin to generate metal carbides in situ, at least the particle surfaces or the entirety of the particles of which are metal carbides; and
   the composite metal oxide particles are $SiO_2/ZrO_2$ composite metal oxide particles and the metal carbide particles are SiC/ZrC composite carbide particles.

* * * * *